(12) United States Patent
Kurasawa et al.

(10) Patent No.: US 12,017,307 B2
(45) Date of Patent: Jun. 25, 2024

(54) FLUX FOR RESIN-CORED SOLDER, RESIN-CORED SOLDER, AND SOLDERING METHOD

(71) Applicants: Senju Metal Industry Co., Ltd., Tokyo (JP); DENSO CORPORATION, Aichi (JP)

(72) Inventors: Yoko Kurasawa, Tokyo (JP); Motohiro Onitsuka, Tokyo (JP); Hisashi Tokutomi, Tokyo (JP); Kei Endo, Aichi (JP); Kazuyuki Hamamoto, Aichi (JP)

(73) Assignees: Senju Metal Industry Co., Ltd., Tokyo (JP); DENSO CORPORATION, Tokyo (JP)

( * ) Notice: Subject to any disclaimer, the term of this patent is extended or adjusted under 35 U.S.C. 154(b) by 0 days.

(21) Appl. No.: 18/266,377

(22) PCT Filed: Nov. 10, 2021

(86) PCT No.: PCT/JP2021/041302
§ 371 (c)(1),
(2) Date: Jun. 9, 2023

(87) PCT Pub. No.: WO2022/123988
PCT Pub. Date: Jun. 16, 2022

(65) Prior Publication Data
US 2024/0033863 A1 Feb. 1, 2024

(30) Foreign Application Priority Data

Dec. 11, 2020 (JP) .................................. 2020-205897
Sep. 22, 2021 (JP) .................................. 2021-154190

(51) Int. Cl.
*B23K 35/362* (2006.01)
*B23K 1/20* (2006.01)
*B23K 35/36* (2006.01)

(52) U.S. Cl.
CPC ............ *B23K 35/362* (2013.01); *B23K 1/203* (2013.01); *B23K 35/3613* (2013.01); *B23K 35/3616* (2013.01)

(58) Field of Classification Search
CPC .................................................... B23K 35/362
See application file for complete search history.

(56) References Cited

U.S. PATENT DOCUMENTS

| 10,265,808 | B2 | 4/2019 | Onitsuka et al. | |
| 11,292,089 | B2 | 4/2022 | Onitsuka et al. | |
| 2016/0184937 | A1* | 6/2016 | Onitsuka | B23K 35/0266 |
| | | | | 148/23 |
| 2020/0114477 | A1* | 4/2020 | Yukikata | B23K 35/3601 |
| 2021/0197323 | A1 | 7/2021 | Kurasawa et al. | |

FOREIGN PATENT DOCUMENTS

| JP | 542388 A | 2/1993 |
| JP | 542389 A | 2/1993 |
| JP | 2009195938 A | 9/2009 |
| JP | 2016120507 A | 7/2016 |
| JP | 20201077 A | 1/2020 |
| JP | 2021102218 A | 7/2021 |
| WO | 2019142795 A1 | 7/2019 |

* cited by examiner

Primary Examiner — Jophy S. Koshy
(74) Attorney, Agent, or Firm — The Webb Law Firm

(57) ABSTRACT

Provided is a flux for resin-cored solder that is used in resin-cored solder that is supplied into a through hole formed along a central axis of a soldering iron. The flux includes 60% by mass to 99.9% by mass of a rosin ester to a total mass of the flux, 0.1% by mass to 15% by mass of a covalent halogen compound to the total mass of the flux, and more than 0% by mass to 10% by mass of rosin amine, N,N-diethyloctylamine, or rosin amine and N,N-diethyloctylamine to the total mass of the flux.

7 Claims, 3 Drawing Sheets

FLUX FOR RESIN-CORED SOLDER, RESIN-CORED SOLDER, AND SOLDERING METHOD

CROSS-REFERENCE TO RELATED APPLICATIONS

This application is the United States national phase of International Application No. PCT/JP2021/041302 filed Nov. 10, 2021, and claims priority to Japanese Patent Application Nos. 2020-205897 filed Dec. 11, 2020 and 2021-154190 filed Sep. 22, 2021, the disclosures of which are hereby incorporated by reference in their entireties.

BACKGROUND

Field

The present invention relates to a flux for resin-cored solder, resin-cored solder, and a soldering method.

Description of Related Art

In general, a flux used for soldering has properties of chemically removing metal oxides present on solder and the metal surface of a joining object to be soldered, and moving metal elements at the boundary therebetween. Hence, soldering using a flux can form intermetallic compounds between solder and the metal surface of a joining object, thereby producing a strong joint.

As solder used for soldering, there has been wire-shaped solder filled with a flux, which is referred to as resin-cored solder. A flux supposed to be used in such resin-cored solder has been proposed (e.g., in Patent Literatures 1 and 2).

As a soldering method using resin-cored solder, there has been known using a heating member, which is referred to as a soldering iron. Regarding this, there has been proposed a technique of providing a through hole at the central axis of a soldering iron and supplying resin-cored solder into the through hole to perform soldering (e.g., in Patent Literature 3).

CITATION LIST

Patent Literature

Patent Literature 1: JP H05-42388 A
Patent Literature 2: JP H05-42389 A
Patent Literature 3: JP 2009-195938 A

SUMMARY

If soldering is performed using a soldering iron such as the one disclosed in Patent Literature 3, rosin that is contained in a flux for resin-cored solder to be supplied into the through hole and hardly volatilizes in a thermal history expected during soldering may become residues after heated and adhere to the inner surface of the through hole of the soldering iron. In the soldering using the soldering iron disclosed in Patent Literature 3, soldering is performed continuously with resin-cored solder supplied into the through hole of the soldering iron in a state in which the soldering iron is controlled so as to keep a predetermined temperature exceeding the melting point of solder. As a result, adhered matters, such as the residues, keep being heated and become carbide. This is a cause of burning in the through hole. The carbide is accumulated in the through hole of the soldering iron, which makes the diameter of the through hole small. This may cause the resin-cored solder to be unable to be supplied.

There has been proposed therefore a technique of using volatile rosin as the main component of a flux that is used by a soldering iron such as the one disclosed in Patent Literature 3 in order to volatilize the flux during solder melting, thereby preventing carbide from being accumulated in the through hole of the soldering iron.

By using volatile rosin as the main component, most of the flux volatilizes as intended. However, the flux residues, which are the remaining part of the flux, become carbide and are accumulated in the through hole of a soldering iron, and the through hole of the soldering iron is eventually clogged with deposits thereof.

The present invention has been conceived in order to solve such a problem(s), and objects thereof include providing a flux that facilitates discharge of deposits, and resin-cored solder and a soldering method using this flux.

A flux containing nonvolatile rosin, which hardly volatilizes, has been considered unsuitable as a flux for resin-cored solder that is used by a soldering iron such as the one disclosed in Patent Literature 3. Regarding this, the present inventors have found that, of nonvolatile rosin, a rosin ester(s) can liquefy deposits of flux residues in the through hole of a soldering iron and facilitate discharge of the deposits to the outside, thereby preventing the deposits from adhering to the inside of the through hole of the soldering iron.

Hence, the present invention is a flux for resin-cored solder that is used in resin-cored solder that is supplied into a through hole formed along the central axis of a soldering iron, including: 60% by mass to 99.9% by mass of a rosin ester(s) to the total mass of the flux; 0.1% by mass to 15% by mass of a covalent halogen compound(s) to the total mass of the flux; and more than 0% by mass to 10% by mass of rosin amine, N,N-diethyloctylamine, or rosin amine and N,N-diethyloctylamine to the total mass of the flux.

The covalent halogen compound is one type or two or more types of trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, 2,2-bis(bromomethyl)-1,3-propanediol, tetrabromoethane, tetrabromobutane, tetrabromophthalic acid, bromosuccinic acid, and 2,2,2-tribromoethanol.

The rosin ester is one or more types of rosin esters each being one type of rosin esterified or one or more types of rosin esters each being a mixture of two or more types of rosin esterified, and the rosin to be esterified is any or any mixture of natural rosin and rosin derivatives obtained from the natural rosin, wherein the rosin derivatives are: purified rosin; polymerized rosin; hydrogenated rosin; disproportionated rosin, hydrogenated disproportionated rosin; acid-modified rosin; phenol-modified rosin; an α, β-unsaturated carboxylic acid-modified product; a purified product, a hydride and a disproportionated product of the polymerized rosin; and a purified product, a hydride and a disproportionated product of the α, β-unsaturated carboxylic acid-modified product.

The flux may further include 0% by mass to 39% by mass of other rosin to the total mass of the flux and/or further include 0% by mass to 39% by mass of an activator(s) other than the covalent halogen compound to the total mass of the flux.

Further, the present invention is (a) resin-cored solder including solder filled with the above-described flux for resin-cored solder.

Still further, the present invention is a soldering method including: supplying resin-cored solder that is solder filled with a flux for resin-cored solder including 60% by mass to 99.9% by mass of a rosin ester(s) to the total mass of the flux, by mass to 15% by mass of a covalent halogen compound(s) to the total mass of the flux; and more than 0% by mass to 10% by mass of rosin amine, N,N-diethyloctylamine, or rosin amine and N,N-diethyloctylamine to the total mass of the flux into a through hole formed along the central axis of a soldering iron; and heating the resin-cored solder to a temperature exceeding the melting point of the solder with the soldering iron, thereby heating a joining object and melting the resin-cored solder.

Advantageous Effects of Invention

The rosin ester can liquefy deposits of the flux residues in the through hole of a soldering iron and facilitate discharge of the deposits to the outside, thereby preventing the deposits from adhering to the inside of the through hole of the soldering iron.

Further, addition of the covalent halogen compound, which is a halogen compound not classified as a halide (halogen element that does not bind), can achieve excellent usability without impairing reliability.

DETAILED DESCRIPTION

Figure 1:
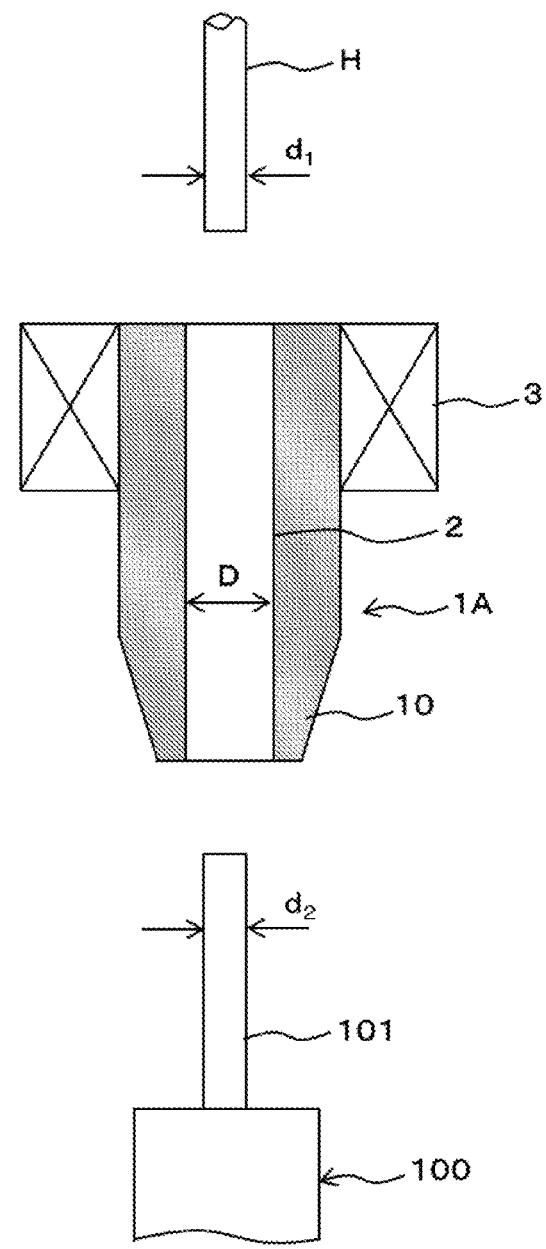
FIG. 1 This illustrates an example of a soldering iron that is used in a soldering method of an embodiment.

<Examples of Flux for Resin-Cored Solder of Embodiment>

A flux for resin-cored solder of an embodiment contains a rosin ester(s) and a covalent halogen compound(s), which is a halogen compound not classified as a halide.

Rosin esters can liquefy deposits of flux residues in a through hole of a soldering iron and facilitate discharge of the deposits to the outside, thereby preventing the deposits from adhering to the inside of the through hole of the soldering iron.

However, a flux containing a rosin ester(s) has a problem that the acid value of the base material (rosin ester and other rosin) in the flux decreases. For the flux containing a predetermined amount of the rosin ester that can liquefy deposits of the flux residues, a conventional additive amount of an amine halogen salt(s) is insufficient for activity, and no wetting is likely to occur in a soldering process of supplying resin-cored solder into a through hole formed along the central axis of a soldering iron to perform soldering. In order to improve wettability, increasing the amount of the amine halogen salt could be done, but increasing the amount of the amine halogen salt increases the content of a halide(s) (halogen element that does not bind). As a result, reliability may decrease.

To overcome this, the flux for resin-cored solder of this embodiment, which is used in resin-cored solder that is supplied into a through hole formed along the central axis of a soldering iron, contains 60% by mass to 99.9% by mass of the rosin ester to the total mass of the flux and 0.1% by mass to 15% by mass of the covalent halogen compound, which is a halogen compound not classified as a halide, to the total mass of the flux. This can prevent the through hole of a soldering iron from being clogged with the deposits, and also achieve excellent usability without impairing reliability.

If the content of the rosin ester is less than 60% by mass, which is the lower limit specified in the present invention, the effect of preventing the through hole of a soldering iron from being clogged with the deposits is not sufficient. If the content of the rosin ester is more than 99.9% by mass, which is the upper limit specified in the present invention, solder's wettability decreases.

If the content of the covalent halogen compound is less than 0.1% by mass, which is the lower limit specified in the present invention, usability decreases. If the content of the covalent halogen compound is more than 15% by mass, which is the upper limit specified in the present invention, reliability decreases.

It is preferable that the rosin ester be one or more types of rosin esters each being one type of rosin esterified or one or more types of rosin esters each being a mixture of two or more types of rosin esterified. Examples of the rosin to be esterified include natural rosin, such as gum rosin, wood rosin and tall oil rosin, and derivatives obtained from the natural rosin. Examples of the rosin derivatives include: purified rosin; polymerized rosin; hydrogenated rosin; disproportionated rosin; hydrogenated disproportionated rosin; acid-modified rosin; phenol-modified rosin; α, β-unsaturated carboxylic acid-modified products (acrylated rosin, maleated rosin, fumarated rosin, etc.); purified products, hydrides and disproportionated products of polymerized rosin; purified products, hydrides and disproportionated products of α, β-unsaturated carboxylic acid-modified products; and mixtures of any of these. The rosin ester is preferably solid, but may be liquid if the flux can have a viscosity to be processed to form resin-cored solder. The viscosity required for the flux for resin-cored solder is 3,500 Pa·s or more, for example.

It is preferable that the covalent halogen compound be one type or two or more types of trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, 2,2-bis(bromomethyl)-1,3-propanediol, tetrabromoethane, tetrabromobutane, tetrabromophthalic acid, bromosuccinic acid, and 2,2,2-tribromoethanol.

The flux for resin-cored solder of this embodiment may further contain 0% by mass to 39% by mass of rosin or resin other than the rosin ester to the total mass of the flux. Examples of the other rosin include natural rosin, such as gum rosin, wood rosin and tall oil rosin, and derivatives obtained from the natural rosin. Examples of the rosin derivatives include: purified rosin; polymerized rosin; hydrogenated rosin; disproportionated rosin; hydrogenated disproportionated rosin; acid-modified rosin; phenol-modified rosin; α, β-unsaturated carboxylic acid-modified products (acrylated rosin, maleated rosin, fumarated rosin, etc.), purified products, hydrides and disproportionated products of polymerized rosin; and purified products, hydrides and disproportionated products of α, β-unsaturated carboxylic acid-modified products. One or more types of these can be used.

Examples of the resin other than the other rosin include terpene resin, modified terpene resin, terpene phenol resin, modified terpene phenol resin, styrene resin, modified styrene resin, xylene resin, and modified xylene resin, and at least one type selected from these can be further contained in the flux. Examples of the modified terpene resin usable include aromatic modified terpene resin, hydrogenated terpene resin, and hydrogenated aromatic modified terpene resin. Examples of the modified terpene phenol resin usable include hydrogenated terpene phenol resin. Examples of the modified styrene resin usable include styrene acrylic resin and styrene maleic acid resin. Examples of the modified xylene resin usable include phenol-modified xylene resin, alkylphenol-modified xylene resin, phenol-modified resol-type xylene resin, polyol-modified xylene resin, and polyoxyethylene-added xylene resin.

The flux for resin-cored solder of this embodiment may further contain 0% by mass to 39% by mass of an activator(s) other than the covalent halogen compound to the total mass of the flux.

The other activators refer to an organic acid(s), amine(s), a halogen compound(s) other than the covalent halogen compound, which is a halogen compound not classified as a halide, and the like. It is preferable that the flux contain, as the other activators, 0% by mass to 20% by mass of an organic acid(s), 0% by mass to 10% by mass of an amine(s), and 0% by mass to 3% by mass of an amine halogen salt(s).

Examples of the organic acid include glutaric acid, adipic acid, azelaic acid, eicosane diacid, citric acid, glycolic acid, succinic acid, salicylic acid, diglycolic acid, dipicolinic acid, dibutyl aniline diglycolic acid, suberic acid, sebacic acid, thioglycol acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 4-tert-butylbenzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid, and linolenic acid.

Examples of the organic acid further include dimer acid that is a reactant of oleic acid and linoleic acid, trimer acid that is a reactant of oleic acid and linoleic acid, hydrogenated dimer acid that is obtained by adding hydrogen to dimer acid that is a reactant of oleic acid and linoleic acid, and hydrogenated trimer acid that is obtained by adding hydrogen to trimer acid that is a reactant of oleic acid and linoleic acid. Examples of the organic acid still further include, as dimer acid that is not a reactant of oleic acid and linoleic acid, trimer acid that is not a reactant of oleic acid and linoleic acid, hydrogenated dimer acid that is obtained by adding hydrogen to dimer acid that is not a reactant of oleic acid and linoleic acid, and hydrogenated trimer acid that is obtained by adding hydrogen to trimer acid that is not a reactant of oleic acid and linoleic acid, dimer acid that is a reactant of acrylic acid, trimer acid that is a reactant of acrylic acid, dimer acid that is a reactant of methacrylic acid, trimer acid that is a reactant of methacrylic acid, dimer acid that is a reactant of acrylic acid and methacrylic acid, trimer acid that is a reactant of acrylic acid and methacrylic acid, dimer acid that is a reactant of oleic acid, trimer acid that is a reactant of oleic acid, dimer acid that is a reactant of linoleic acid, trimer acid that is a reactant of linoleic acid, dimer acid that is a reactant of linolenic acid, trimer acid that is a reactant of linolenic acid, dimer acid that is a reactant of acrylic acid and oleic acid, trimer acid that is a reactant of acrylic acid and oleic acid, dimer acid that is a reactant of acrylic acid and linoleic acid, trimer acid that is a reactant of acrylic acid and linoleic acid, dimer acid that is a reactant of acrylic acid and linolenic acid, trimer acid that is a reactant of acrylic acid and linolenic acid, dimer acid that is a reactant of methacrylic acid and oleic acid, trimer acid that is a reactant of methacrylic acid and oleic acid, dimer acid that is a reactant of methacrylic acid and linoleic acid, trimer acid that is a reactant of methacrylic acid and linoleic acid, dimer acid that is a reactant of methacrylic acid and linolenic acid, trimer acid that is a reactant of methacrylic acid and linolenic acid, dimer acid that is a reactant of oleic acid and linolenic acid, trimer acid that is a reactant of oleic acid and linolenic acid, dimer acid that is a reactant of linoleic acid and linolenic acid, trimer acid that is a reactant of linoleic acid and linolenic acid, hydrogenated dimer acid that is obtained by adding hydrogen to any of the abovementioned dimer acids that are each not a reactant of oleic acid and linoleic acid, and hydrogenated trimer acid that is obtained by adding hydrogen to any of the abovementioned trimer acids that are each not a reactant of oleic acid and linoleic acid. The present invention may contain any one or more types of the abovementioned organic acids.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2, 2'-methylene bisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]

methylbenzotriazole, 2,2'-[[(methyl-1H-benzotriazol-1-yl) methyl]imino]bisethanol, 1-(1',2'-dicarboxyethyl) benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, 5-phenyltetrazole, rosin amine, N,N-dimethyloctylamine, N,N-diethyloctylamine, and N,N-diethylaniline. The present invention may contain any one or more types of the abovementioned amines.

The amine halide salt is a compound obtained by reacting an amine with a hydrogen halide, and examples thereof include aniline hydrochloride and aniline hydrobromide. Examples of the amine of the amine-hydrogen halide salt usable include the abovementioned amines, such as ethylamine, ethylenediamine, triethylamine, methylimidazole, 2-ethyl-4-methylimidazole, and N,N-diethylaniline, and examples of the hydrogen halide thereof include hydrides of chlorine, bromine, iodine and fluorine (hydrogen chloride, hydrogen bromide, hydrogen iodide and hydrogen fluoride). Further, borofluoride may also be used. Examples of the borofluoride include fluoroboric acid. The present invention may contain any one or more of amine halogen salts that are each a compound obtained by reacting any of the abovementioned amines with any of the abovementioned hydrogen halides. Examples of the amine halogen salts, which are each a compound obtained by reacting an amine with a hydrogen halide, include N,N-diethylaniline·HBr.

When an organic acid and an amine are added to the flux, predetermined amounts of the organic acid and the amine are reacted to be salt. Therefore, two or more types of organic acids and amines may be reacted to be salt and then added to the flux in order to prevent or reduce reaction of the organic acid(s) and the amine(s).

The flux for resin-cored solder of this embodiment may further contain, as an additive(s), 0% by mass to 10% by mass of a phosphate ester(s), 0% by mass to 5% by mass of a silicone(s), 0% by mass to 5% by mass of a surfactant(s), 0% by mass to 13% by mass of a solvent(s), and 0% by mass to 3% by mass of a defoamer(s).

Examples of the phosphate ester include methyl acid phosphate, ethyl acid phosphate, isopropyl acid phosphate, monobutyl acid phosphate, butyl acid phosphate, dibutyl acid phosphate, butoxyethyl acid phosphate, 2-ethylhexy acid phosphate, bis(2-ethylhexy) phosphate, monoisodecyl acid phosphate, isodecyl acid phosphate, lauryl acid phosphate, isotridecyl acid phosphate, stearyl acid phosphate, oleyl acid phosphate, beef tallow phosphate, coconut oil phosphate, isostearyl acid phosphate, alky acid phosphate, tetracosyl acid phosphate, ethylene glycol acid phosphate, 2-hydroxyethyl methacrylate acid phosphate, dibutyl pyrophosphate acid phosphate, 2-ethylhexylphosphonic acid mono-2-ethylhexyl, and alkyl(alkyl)phosphonate. The present invention may contain any one or more types of the abovementioned phosphate esters.

Examples of the silicone include dimethyl silicone oil, cyclic silicone oil, methylphenyl silicone oil, methyl hydrogen silicone oil, higher fatty acid-modified silicone oil, alkyl-modified silicone oil, alkyl aralkyl-modified silicone oil, amino-modified silicone oil, epoxy-modified silicone oil, polyether-modified silicone oil, alkyl polyether-modified silicone oil, and carbinol-modified silicone oil. The present invention may contain any one or more types of the abovementioned silicones.

Examples of the surfactant include acrylic polymer, vinyl ether polymer, olefin polymer, and butadiene polymer, and examples of the acrylic polymer include polyoxyalkylene polyalkylamide. The present invention may contain any one or more types of the abovementioned surfactants.

Examples of the solvent include various glycol ether-based solvents, such as phenyl glycol, hexylene glycol, and hexyldiglycol, but not limited thereto, and any well-known solvents can be used. The solvent may be either solid or liquid. Examples of the solid solvent include neopentyl glycol (2,2-dimethyl-1,3-propanediol), dioxane glycol, 4-(1, 1,3,3-tetramethylbutyl)phenol, and catechol. The present invention may contain any one or more types of the abovementioned solvents.

Examples of the defoamer include acrylic polymer, vinyl ether polymer, and butadiene polymer. The present invention may contain any one or more types of the abovementioned deformers.

<Configuration Example of Resin-Cored Solder of Embodiment>

Resin-cored solder of an embodiment is wire-shaped solder filled with the above-described flux for resin-cored solder. The flux for resin-cored solder is required to be solid at room temperature (e.g., 25° C.) in order not to flow out in a step of processing solder, or required to have a predetermined high viscosity with which the flux does not flow out. The viscosity required for the flux for resin-cored solder is 3,500 Pa·s or more, for example. If the flux for resin-cored solder is a low-viscosity liquid (viscosity of less than 3,500 Pa·s) at 25° C., workability of the resin-cored solder decreases, which is undesirable. As far as the resin-cored solder can be supplied into a through hole formed along the central axis of a soldering iron described below, the shape of the resin-cored solder is not limited to the shape of a continuous wire having a circular cross section, and hence can be changed to another as appropriate. Examples of the shape include: the shape of a continuous wire having a cross section of a shape having corners such as a square; the shape of a continuous wire having a cross section of a certain shape such as a star shape; the shape of discontinuous pellets, such as cylindrical pellets or prismatic pellets, each having a cross section of a certain shape; the shape of a continuous sheet; the shape of discontinuous sheets; the shape of a continuous sphere; and the shape of discontinuous spheres.

The wire diameter of the resin-cored solder is 0.1 mm to 3.0 mm, preferably 0.3 mm to 1.6 mm. The content of the flux with which the resin-cored solder is filled is, with the resin-cored solder as 100, 0.5% by mass to 6% by mass, preferably 1.5% by mass to 4.5% by mass, and further preferably 2.0% by mass to 4.0% by mass.

Solder thereof is composed of Sn alone or an Sn—Ag-based alloy, an Sn—Cu-based alloy, an Sn—Ag—Cu-based alloy, an Sn—Bi-based alloy, an Sn—In-based alloy, an Sn—Zn-based alloy, an Sn—Pb-based alloy or the like or an alloy composed of Sb, Bi, In, Cu, Zn, As, Ag, Cd, Fe, Ni, Co, Au, Ge, Ga, Al, Mn, Ti, P, Pb, Zr or the like added to any of the abovementioned alloys.

<Example of Soldering Method of Embodiment>

FIG. 1 illustrates an example of a soldering iron that is used in a soldering method of an embodiment. FIG. 2A, FIG. 2B, FIG. 2C and FIG. 2D illustrate the soldering method of this embodiment.

The soldering method of this embodiment is applied to through-hole technology, single-sided boards, and so forth. A soldering iron 1A that is used in the soldering method of this embodiment has a through hole 2 formed along the central axis of the soldering iron 1A and a heater 3 as a heating means that heats the soldering iron 1A.

The diameter D of the through hole 2 of the soldering iron 1A is larger than the diameter $d_1$ of a resin-cored solder H.

Hence, the resin-cored solder H can be supplied to a tip 10 of the soldering iron 1A through the through hole 2. Also, the diameter D of the through hole 2 of the soldering iron 1A is larger than the diameter $d_2$ of a lead terminal 101 of an electronic component 100. Hence, the lead terminal 101 can be inserted into the through hole 2.

Figure 2A:
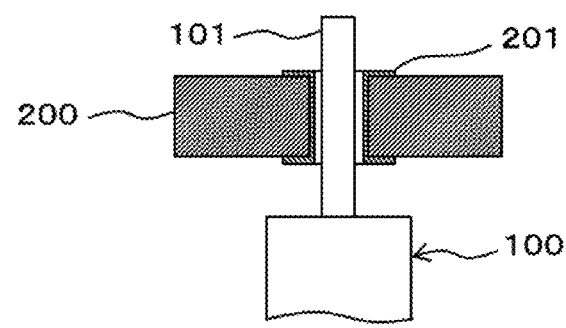
FIG. 2A This illustrates the soldering method of the embodiment.
Figure 2B:
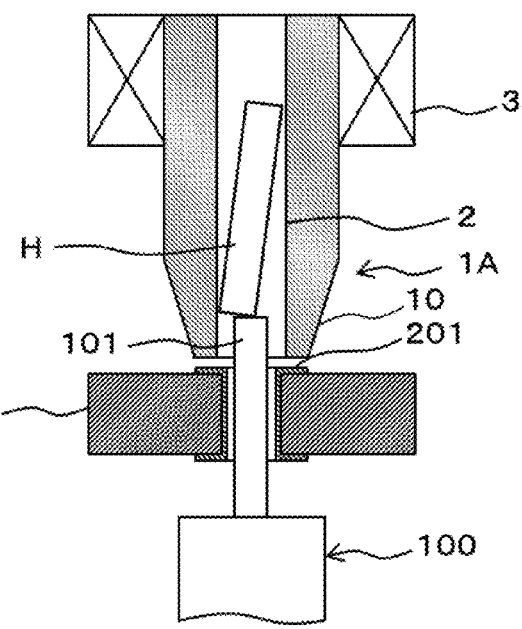
FIG. 2B This illustrates the soldering method of the embodiment.

In the soldering method of this embodiment, as shown in FIG. 2A, the lead terminal 101 of the electronic component 100 is inserted into a through hole 201 formed in a substrate 200. Meanwhile, the soldering iron 1A is heated by the heater 3 to a temperature exceeding the melting point of solder, and controlled so as to keep a predetermined temperature exceeding the melting point of solder. Next, as shown in FIG. 2B, the tip 10 of the soldering iron 1A is brought into contact with or near the through hole 201, in which the lead terminal 101 is inserted, so that the lead terminal 101 is inserted into the through hole 2 of the soldering iron 1A.

Next, the resin-cored solder H, which has been cut to have a predetermined length, is supplied into the through hole 2 of the soldering iron 1A, thereby contacting the lead terminal 101, which is inserted in the through hole 2.

Figure 2C:
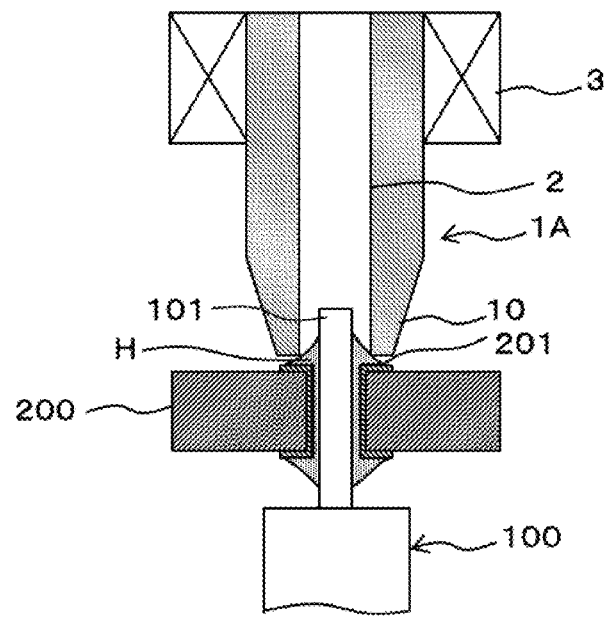
FIG. 2C This illustrates the soldering method of the embodiment.

Since the soldering iron 1A is controlled so as to keep a predetermined temperature exceeding the melting point of solder, the soldering iron 1A heats and melts the resin-cored solder H as shown in FIG. 2C, and also heats the through hole 201 and the lead terminal 101.

While the soldering iron 1A is heating the resin-cored solder H to the temperature exceeding the melting point of solder, the viscosity of the flux in the resin-cored solder decreases, and the flux flows to the through hole 201 and the lead terminal 101, so that metal oxides on the surfaces of the solder, the through hole 201 and the lead terminal 101 are removed, and the molten solder wetly spreads.

Figure 2D:
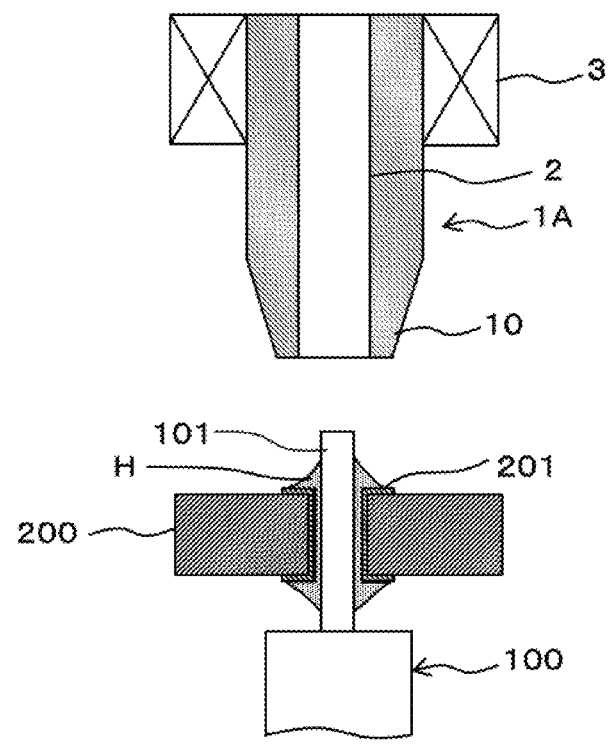
FIG. 2D This illustrates the soldering method of the embodiment.

Next, as shown in FIG. 2D, the soldering iron 1A is separated or made away from the through hole 201, so that the solder, which wetly spreads on/in the through hole 201 and the lead terminal 101, is hardened.

<Examples of Effects of Flux for Resin-Cored Solder, Resin-Cored Solder and Soldering Method>

A flux for resin-cored solder containing a predetermined amount of a rosin ester(s), the predetermined amount being specified in the present invention, can, in the above-described soldering method, liquefy deposits of the flux residues in the through hole of a soldering iron and facilitate discharge of the deposits to the outside, thereby preventing the deposits from adhering to the inside of the through hole of the soldering iron.

Hence, even when soldering is performed continuously with the resin-cored solder H supplied into the through hole 2 in the state in which the soldering iron 1A is controlled so as to keep a predetermined temperature exceeding the melting point of solder, it is possible to prevent deposits of the residues from adhering in the through hole 2, and accordingly prevent problems, such as a problem that the through hole 2 of the soldering iron 1A is clogged with the deposits of the residues, from arising.

The flux for resin-cored solder further containing a predetermined amount of a covalent halogen compound(s), which is a halogen compound not classified as a halide, the predetermined amount being specified in the present invention, can, in the above-described soldering method, achieve excellent usability without impairing reliability.

Examples

Fluxes for resin-cored solder were prepared with compositions of Examples and Comparative Examples shown in TABLES 1, 2, 3, 4 and 5 below, and a through-hole wettability test and a reliability test were conducted with the soldering method of supplying resin-cored solder into a through hole formed along the central axis of a soldering iron to see whether their resin-cored solders were supplied and to test reliability and usability of the resin-cored solders supplied. In the reliability test, insulation reliability (insulation resistance value), halide amount (potential difference), solderability and deposition of activators were tested. The composition ratio in TABLES 1 to 5 is expressed in percent by mass with the total mass of a flux as 100.

<Through-Hole Wettability Test>

(1) Testing Method

Through-hole substrates each having a thickness of 1.6 mm with pins inserted were prepared and each soldered at 40 points with a set temperature of 400° C. of a soldering iron for a soldering time of 1.0 second using J-CAT300SLV manufactured by Apollo Seiko Ltd. The soldering at the through-hole wettability test was performed by supplying each resin-cored solder into the through hole formed along the central axis of the soldering iron, as described above. Each substrate after the test was observed under a digital microscope VHX-6000 manufactured by Keyence Corporation, and determination was made with the following criteria.

(2) Criteria for Determination

◎ (double circle): Percentage of points where through holes are filled with solder is 100%.

○ (single circle): Percentage of points where through holes are filled with solder is 95% or higher but lower than 100%.

x (cross): Percentage of points where through holes are filled with solder is lower than 95%.

<Reliability Test>

(a) Insulation Reliability (1) Testing Method

In accordance with JIS Z 3197, comb-shaped substrates were soldered with the respective resin-cored solders and placed under conditions of a high temperature of 85° C. and a high humidity of 85% RH, and a voltage of 100 V was applied thereto and electrical insulation was measured using an ion migration evaluation system AMI-150-U-5 manufactured by ESPEC Corp. JIS Z 3283 specifies that an insulation resistance value of $1 \times 10^8 \Omega$ or more after a lapse of 168 hours is JIS A class. Hence, determination was made with the following criteria.

(2) Criteria for Determination

◎ (double circle): Insulation resistance value after 168 hours is $1 \times 10^8 \Omega$ or more.

x (cross): Insulation resistance value after 168 hours is less than $1 \times 10^8 \Omega$.

(b) Potentiometry (1) Testing Method

In accordance with JIS Z 3197, a 2-propanol solution of each flux for resin-cored solder was titrated with an aqueous silver nitrate solution using an automatic potentiometric titrator AT-610 manufactured by Kyoto Electronics Manufacturing Co. Ltd., and the halide content was obtained from a changing point in potential difference. JIS Z 3283 specifies that a halide content of 0.5% or less is JIS A class. Hence, determination was made with the following criteria.

(2) Criteria for Determination
◎ (double circle): Halide content is 0.5% or less.
x (cross): Halide content is more than 0.5%.
(c) Solderability
(1) Testing Method Through-hole substrates each having a thickness of 1.6 mm with tape attached to the back side without pins inserted were prepared and each soldered by 15,000 shots with a set temperature of 400° C. of the soldering iron for a soldering time of 1.0 second. The soldering for solderability was performed by supplying each resin-cored solder into the through hole formed along the central axis of the soldering iron, as described above. When 15,000 shots finished, the inside diameter of the through hole of the soldering iron was observed under the digital microscope and thereafter the through-hole wettability test was also conducted, and determination was made with the following criteria.

(2) Criteria for Determination

◎ (double circle): Inside diameter of through hole of soldering iron containing deposits is 60% or more of inside diameter of through hole thereof not containing deposits, and result of through-hole wettability test is ◎ (double circle).

○ (single circle): Inside diameter of through hole of soldering iron containing deposits is 60% or more of inside diameter of through hole thereof not containing deposits, and result of through-hole wettability test is ○ (single circle).

x (cross): Inside diameter of through hole of soldering iron containing deposits is less than 60% of inside diameter of through hole thereof not containing deposits, or result of through-hole wettability test is x (cross).

(c) Deposition of Activator
(1) Testing Method

The prepared fluxes for resin-cored solder of Examples and Comparative Examples were transferred to a container to be cooled, and when they solidified, their appearances were overserved with eyes. Deposition of activators therein needs to be avoided because it deteriorates the appearance at the time of soldering, and also increases influence on performance stability and concern about reliability due to inhomogeneity/non-uniformity of the flux components. Hence, determination was made with the following criteria.

(2) Criteria for Determination

◎ (double circle): Deposition of activators is not observed in solidified flux.

x (cross): Deposition of activators is observed in solidified flux.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Rosin Ester | Rosin Ester | 60 | 64 | 67 | 68 | 68 | 68.5 | 70 | 70 | 70.7 |
| Other Base | Hydrogenated Rosin | 36.4 | | | | | | | | |
| Rosin | Acid-Modified Rosin | | 26.4 | 17.5 | 28.4 | 28.4 | 19 | 3.4 | 5.1 | 11 |
| Covalent Halogen Compound | 2,2,2-Tribromoethanol | 2 | 2 | 2.7 | 2 | | 3 | 15 | 10 | 3 |
| | Trans-2,3-Dibromo-2-Buten-1,4-Diol | | | | | 2 | | | 3 | |
| Amine Halogen Salt | N,N-Diethylaniline•HBr | | 2 | | | | | | | |
| Organic Acid | Glutaric Acid | 0.3 | 4.3 | 0.5 | 0.3 | 0.3 | | | | |
| | Adipic Acid | | | | | | 2 | | | |
| | Stearic Acid | | | | | | | 10 | 10 | 1 |
| | 12-Hydroxystearic Acid | | | | | | | | | |
| Amine | 2-Undecylimidazole | 1.3 | | | | | | | | 1.3 |
| | 2-Phenylimidazole | | 1.3 | 2.3 | | | | | | |
| | 2-(2'-Hydroxy-5-Tert-Octylphenyl) Benzotriazole | | | | 1.3 | 1.3 | 2.5 | 1.6 | 1.9 | |
| | Rosin Amine | | | | | | | | | |
| | N,N-Diethyloctylamine | | | | | | | | | |
| | 5-Phenyltetrazole | | | | | | | | | |
| Phosphate Ester | Isodecyl Acid Phosphate | | | | 10 | | | | | |
| Silicone | Silicone | | | | | | | | | |
| Surfactant | Polyoxyalkylene Polyalkylamide | | | | | | 5 | | | |
| Solvent | Neopentyl Glycol | | | | | | | | | 13 |
| Defoamer | Acrylic Polymer | | | | | | | | | |
| Through-Hole Wettability Test | Through-Hole Wettability at Zero Shot | ◎ | ◎ | ◎ | ◎ | ◎ | ◎ | ◎ | ◎ | ◎ |
| Reliability Test | Insulation Resistance Value | ◎ | ◎ | ◎ | ◎ | ◎ | ◎ | ◎ | ◎ | ◎ |
| | Potentiometric Titration Test | ◎ | ◎ | ◎ | ◎ | ◎ | ◎ | ◎ | ◎ | ◎ |
| | Through-Hole Wettability after 15,000 Shots | ◎ | ◎ | ◎ | ◎ | ◎ | ◎ | ◎ | ◎ | ◎ |
| | Deposition of Activator | ◎ | ◎ | ◎ | ◎ | ◎ | ◎ | ◎ | ◎ | ◎ |

TABLE 2

| | | Example 10 | Example 11 | Example 12 | Example 13 | Example 14 | Example 15 | Example 16 | Example 17 | Example 18 |
|---|---|---|---|---|---|---|---|---|---|---|
| Rosin Ester | Rosin Ester | 73.5 | 75 | 75 | 75 | 80.9 | 82 | 82.4 | 82.7 | 82.7 |
| Other Base | Hydrogenated Rosin | | | | | | | | | |
| Rosin | Acid-Modified Rosin | 16.5 | 21.4 | | | 14.3 | | 10 | 14 | 14 |

TABLE 2-continued

|  |  | Example 10 | Example 11 | Example 12 | Example 13 | Example 14 | Example 15 | Example 16 | Example 17 | Example 18 |
|---|---|---|---|---|---|---|---|---|---|---|
| Covalent Halogen Compound | 2,2,2-Tribromoethanol | 2 | 2 | 4 | 4 | 2 | 10 | 2 | 1 |  |
|  | Trans-2,3-Dibromo-2-Buten-1,4-Diol |  |  |  |  |  |  |  |  | 1 |
| Amine Halogen Salt | N,N-Diethylaniline•HBr |  |  |  |  |  |  |  |  |  |
| Organic Acid | Glutaric Acid |  |  |  |  | 0.3 |  | 1.3 |  |  |
|  | Adipic Acid |  | 0.3 |  |  |  |  |  | 1 | 1 |
|  | Stearic Acid | 1 |  | 20 |  |  |  |  |  |  |
|  | 12-Hydroxystearic Acid |  |  |  | 20 |  |  |  |  |  |
| Amine | 2-Undecylimidazole | 2 |  |  |  |  |  |  |  |  |
|  | 2-Phenylimidazole |  |  |  |  | 2.5 |  |  |  |  |
|  | 2-(2'-Hydroxy-5-Tert-Octylphenyl)Benzotriazole |  | 1.3 |  |  |  | 8 |  |  |  |
|  | Rosin Amine |  |  | 1 | 1 |  |  |  | 1.3 | 1.3 |
|  | N,N-Diethyloctylamine |  |  |  |  |  |  |  |  |  |
|  | 5-Phenyltetrazole |  |  |  |  |  |  | 1.3 |  |  |
| Phosphate Ester | Isodecyl Acid Phosphate |  |  |  |  |  |  |  |  |  |
| Silicone | Silicone | 5 |  |  |  |  |  |  |  |  |
| Surfactant | Polyoxyalkylene Polyalkylamide |  |  |  |  |  |  |  |  |  |
| Solvent | Neopentyl Glycol |  |  |  |  |  |  |  |  |  |
| Defoamer | Acrylic Polymer |  |  |  |  |  |  | 3 |  |  |
| Through Hole Wettability Test | Through-Hole Wettability at Zero Shot | ◎ | ◎ | ◎ | ◎ | ◎ | ◎ | ◎ | ◎ | ○ |
| Reliability Test | Insulation Resistance Value | ◎ | ◎ | ◎ | ◎ | ◎ | ◎ | ◎ | ◎ | ◎ |
|  | Potentiometric Titration Test | ◎ | ◎ | ◎ | ◎ | ◎ | ◎ | ◎ | ◎ | ◎ |
|  | Through-Hole Wettability after 15,000 Shots | ◎ | ◎ | ◎ | ◎ | ◎ | ◎ | ◎ | ◎ | ○ |
|  | Deposition of Activator | ◎ | ◎ | ◎ | ◎ | ◎ | ◎ | ◎ | ◎ | ◎ |

TABLE 3

|  |  | Example 19 | Example 20 | Example 21 | Example 22 | Example 23 | Example 24 | Example 25 | Example 26 | Example 27 |
|---|---|---|---|---|---|---|---|---|---|---|
| Rosin Ester | Rosin Ester | 83 | 83.3 | 83.3 | 85.9 | 85.9 | 84.4 | 84.4 | 85.4 | 90 |
| Other Base Rosin | Hydrogenated Rosin |  |  |  |  |  |  |  |  |  |
|  | Acid-Modified Rosin | 12.2 | 12.7 | 12.7 | 10 | 10 | 10.6 | 10.6 | 10 |  |
| Covalent Halogen Compound | 2,2,2-Tribromoethanol | 2 | 2 |  | 1.5 |  | 2 | 2 | 2 | 10 |
|  | Trans-2,3-Dibromo-2-Buten-1,4-Diol |  |  | 2 |  | 1.5 |  |  |  |  |
| Amine Halogen Salt | N,N-Diethylaniline•HBr |  |  |  |  |  |  |  |  |  |
| Organic Acid | Glutaric Acid | 0.3 | 0.3 | 0.3 | 0.3 | 0.3 | 0.3 | 0.3 | 1.3 |  |
|  | Adipic Acid |  |  |  |  |  |  |  |  |  |
|  | Stearic Acid |  |  |  |  |  |  |  |  |  |
|  | 12-Hydroxystearic Acid |  |  |  |  |  |  |  |  |  |
| Amine | 2-Undecylimidazole |  |  |  |  |  |  |  |  |  |
|  | 2-Phenylimidazole |  |  |  |  |  |  |  |  |  |
|  | 2-(2'-Hydroxy-5-Tert-Octylphenyl)Benzotriazole |  |  |  |  |  |  |  |  |  |
|  | Rosin Amine | 2.5 | 1.7 | 1,7 |  |  | 1.4 |  |  |  |
|  | N,N-Diethyloctylamine |  |  |  | 2.3 | 2.3 |  |  |  |  |
|  | 5-Phenyltetrazole |  |  |  |  |  | 1.3 | 2.7 | 1.3 |  |
| Phosphate Ester | Isodecyl Acid Phosphate |  |  |  |  |  |  |  |  |  |
| Silicone | Silicone |  |  |  |  |  |  |  |  |  |
| Surfactant | Polyoxyalkylene Polyalkylamide |  |  |  |  |  |  |  |  |  |
| Solvent | Neopentyl Glycol |  |  |  |  |  |  |  |  |  |
| Defoamer | Acrylic Polymer |  |  |  |  |  |  |  |  |  |
| Through-Hole Wettability Test | Through-Hole Wettability at Zero Shot | ◎ | ◎ | ◎ | ◎ | ◎ | ◎ | ◎ | ◎ | ○ |
| Reliability Test | Insulation Resistance Value | ◎ | ◎ | ◎ | ◎ | ◎ | ◎ | ◎ | ◎ | ◎ |
|  | Potentiometric Titration Test | ◎ | ◎ | ◎ | ◎ | ◎ | ◎ | ◎ | ◎ | ◎ |
|  | Through-Hole Wettability after 15,000 Shots | ◎ | ◎ | ◎ | ◎ | ◎ | ◎ | ◎ | ◎ | ○ |
|  | Deposition of Activator | ◎ | ◎ | ◎ | ◎ | ◎ | ◎ | ◎ | ◎ | ◎ |

TABLE 4

|  |  | Example 28 | Example 29 | Example 30 | Example 31 | Example 32 |
|---|---|---|---|---|---|---|
| Rosin Ester | Rosin Ester | 67.9 | 79.9 | 79.9 | 82.1 | 82.1 |
| Other Base Rosin | Hydrogenated Rosin |  |  |  |  |  |
|  | Acid-Modified Rosin | 21.5 | 12.2 | 12.2 | 10 | 10 |
| Covalent Halogen Compound | 2.2.2-Tribromoethanol | 4 | 4 | 4 | 2 | 4 |
|  | Trans-2,3-Dibromo-2-Buten-1,4-Diol |  |  |  | 2 |  |
| Amine Halogen Salt | N,N-Diethylaniline•HBr |  |  |  |  |  |
| Organic Acid | Glutaric Acid | 0.8 | 0.3 | 0.3 |  | 0.3 |
|  | Adipic Acid |  |  |  | 0.3 |  |
|  | Stearic Acid |  |  |  |  |  |
|  | 12-Hydroxystearic Acid |  |  |  |  |  |
| Amine | 2-Undecylimidazole |  | 1.5 |  | 0.5 | 0.5 |
|  | 2-Phenylimidazole |  |  |  |  |  |
|  | 2-(2'-Hydroxy-5-Tert-Octylphenyl) Benzotriazole |  | 1.6 |  |  | 1.6 |
|  | Rosin Amine | 2.1 | 0.5 | 3.6 | 1.5 |  |
|  | N,N-Diethyloctylamine | 1.5 |  |  | 1.6 |  |
|  | 5-Phenyltetrazole |  |  |  |  | 1.5 |
| Phosphate Ester | Isodecyl Acid Phosphate |  |  |  |  |  |
| Silicone | Silicone |  |  |  |  |  |
| Surfactant | Polyoxyalkylene Polyalkylamide |  |  |  |  |  |
| Solvent | Neopentyl Glycol |  |  |  |  |  |
| Defoamer | Acrylic Polymer | 2.2 |  |  |  |  |
| Through-Hole Wettability Test | Through-Hole Wettability at Zero Shot | ◎ | ◎ | ◎ | ◎ | ◎ |
| Reliability Test | Insulation Resistance Value | ◎ | ◎ | ◎ | ◎ | ◎ |
|  | Potentiometric Titration Test | ◎ | ◎ | ◎ | ◎ | ◎ |
|  | Through-Hole Wettability after 15,000 Shots | ◎ | ◎ | ◎ | ◎ | ◎ |
|  | Deposition of Activator | ◎ | ◎ | ◎ | ◎ | ◎ |

TABLE 5

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Rosin Ester | Rosin Ester | 53 | 58 | 83.4 | 86.4 | 80 | 80 | 99.7 | 98.7 |
| Other Base Rosin | Hydrogenated Rosin | 43.4 |  |  |  |  |  |  |  |
|  | Acid-Modified Rosin |  | 38.4 | 10 | 10 | 1.7 | 1.7 |  |  |
| Covalent Halogen Compound | 2,2,2-Tribromoethanol | 2 | 2 |  |  |  |  | 17 |  |
|  | Trans-2,3-Dibromo-2-Buten-1,4-Diol |  |  |  |  | 17 |  |  |  |
| Amine Halogen Salt | N,N-Diethylaniline•HBr |  |  | 5 | 2 |  |  |  |  |
| Organic Acid | Glutaric Acid | 0.3 | 0.3 | 0.3 | 0.3 | 0.3 | 0.3 | 0.3 |  |
|  | Adipic Acid |  |  |  |  |  |  |  |  |
|  | Stearic Acid |  |  |  |  |  |  |  |  |
|  | 12-Hydroxystearic Acid |  |  |  |  |  |  |  |  |
| Amine | 2-Undecylimidazole |  |  |  |  |  |  |  |  |
|  | 2-Phenylimidazole |  |  |  |  |  |  |  |  |
|  | 2-(2'-Hydroxy-5-Tert-Octylphenyl) Benzotriazole | 1.3 | 1.3 | 1.3 | 1.3 | 1 | 1 |  | 1.3 |
|  | Rosin Amine |  |  |  |  |  |  |  |  |
|  | N,N-Diethyloctylamine |  |  |  |  |  |  |  |  |
|  | 5-Phenyltetrazole |  |  |  |  |  |  |  |  |
| Phosphate Ester | Isodecyl Acid Phosphate |  |  |  |  |  |  |  |  |
| Silicone | Silicone |  |  |  |  |  |  |  |  |
| Surfactant | Polyoxyalkylene Polyalkylamide |  |  |  |  |  |  |  |  |

TABLE 5-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Solvent | Neopentyl Glycol | | | | | | | | |
| Defoamer | Acrylic Polymer | | | | | | | | |
| Through-Hole Wettability Test | Through-Hole Wettability at Zero Shot | ◎ | ◎ | ◎ | X | ◎ | ◎ | X | X |
| Reliability Test | Insulation Resistance Value | ◎ | ◎ | ◎ | ◎ | ◎ | X | ◎ | ◎ |
| | Potentiometric Titration Test | ◎ | ◎ | X | ◎ | ◎ | ◎ | ◎ | ◎ |
| | Through-Hole Wettability after 15,000 Shots | X | X | ◎ | X | ◎ | ◎ | X | X |
| | Deposition of Activator | ◎ | ◎ | ◎ | ◎ | X | ◎ | ◎ | ◎ |

The flux for resin-cored solder of each Example, in which the flux contained 60% by mass to 99.9% by mass of the rosin ester to the total mass of the flux and 0.1% by mass to 15% by mass of the covalent halogen compound, which is a halogen compound not classified as a halide, to the total mass of the flux, used in the resin-cored solder supplied into the through hole formed along the central axis of the soldering iron showed excellent results in the through-hole wettability test and the reliability test (insulation reliability (insulation resistance value), halide amount (potential difference), solderability and deposition of activators) with the soldering method of supplying resin-cored solder into a through hole formed on the central axis of a soldering iron.

In contrast, Comparative Examples 1 and 2, in each of which the content of the rosin ester was below the lower limit of its range specified in the present invention, did not have a desired solderability. Comparative Example 3, in which the flux did not contain the covalent halogen compound, which is a halogen compound not classified as a halide, and contained the amine halogen salt, which is a type of halogen compound other than the covalent halogen compound, which is a halogen compound not classified as a halide, above the upper limit of its range specified in the present invention, did not have a desired value regarding the halide amount (potential difference) and accordingly did not show an excellent result therein. Comparative Example 4, in which the flux contained the amine halogen salt within its range specified in the present invention, but did not contain the covalent halogen compound, which is a halogen compound not classified as a halide, did not have desired values regarding the through-hole wettability test and the solderability and accordingly did not show excellent results therein. In contrast, Example 2, in which the flux contained the covalent halogen compound, which is a halogen compound not classified as a halide, within its range specified in the present invention, and contained the amine halogen salt, which is a type of halogen compound other than the covalent halogen compound, which is a halogen compound not classified as a halide, within its range specified in the present invention, showed excellent results in the through-hole wettability test and the solderability with the soldering method of supplying resin-cored solder into a through hole formed along the central axis of a soldering iron. Example 2 showed excellent results in the other items of the reliability test too.

Comparative Example 5, in which the flux contained trans-2,3-dibromo-2-butene-1,4-diol as the covalent halogen compound, which is a halogen compound not classified as a halide, above the upper limit of its range specified in the present invention, did not have a desired value regarding the amount of deposition of activators and accordingly did not show an excellent result therein. Comparative Example 6, in which the flux contained 2,2,2-tribromoethanol as the covalent halogen compound, which is a halogen compound not classified as a halide, above the upper limit of its range specified in the present invention, did not have a desired value regarding the insulation reliability (insulation resistance value) and accordingly did not show an excellent result therein.

Comparative Example 7, in which the flux contained the rosin ester and the organic acid within their ranges specified in the present invention, but did not contain the covalent halogen compound, which is a halogen compound not classified as a halide, did not have desired values regarding the through-hole wettability test and the solderability and accordingly did not show excellent results therein. Comparative Example 8, in which the flux contained the rosin ester and the amine within their ranges specified in the present invention, but did not contain the covalent halogen compound, which is a halogen compound not classified as a halide, did not have desired values regarding the through-hole wettability test and the solderability and accordingly did not show excellent results therein.

As shown in Comparative Examples 4, 7 and 8 described above, the flux not containing the covalent halogen compound, which is a halogen compound not classified as a halide, did not show excellent results in the through-hole wettability test and the solderability with the soldering method of supplying resin-cored solder to a through hole formed along the central axis of a soldering iron, although the flux contained another activator(s) within its(their) range(s) specified in the present invention.

In contrast, as shown in Example 27, the flux containing the covalent halogen compound, which is a halogen compound not classified as a halide, within its range specified in the present invention without containing another activator showed excellent results in the through-hole wettability test and the solderability with the soldering method of supplying resin-cored solder to a through hole formed along the central axis of a soldering iron. Example 27 showed excellent results in the other items of the reliability test too.

Further, as shown in Example 1 or the like, the flux containing the covalent halogen compound, which is a halogen compound not classified as a halide, within its range specified in the present invention and also containing another activator(s) within its(their) range(s) specified in the present invention showed excellent results in the through-hole wettability test and the solderability with the soldering method of supplying resin-cored solder into a through hole formed along the central axis of a soldering iron. Example 1 or the like showed excellent results in the other items of the reliability test too.

It is understand therefrom that a flux for resin-cored solder containing, in addition to a rosin ester(s) within its range specified in the present invention, a covalent halogen compound(s), which is a halogen compound not classified as a halide, within its range specified in the present invention has a technical feature(s) in a flux for resin-cored solder that is used in a soldering method of supplying resin-cored solder into a through hole formed along the central axis of a soldering iron as well as in the soldering method.

As described above, each of the fluxes for resin-cored solder containing 60% by mass to 99.9% by mass of the rosin ester to the total mass of the flux and 0.1% by mass to 15% by mass of the covalent halogen compound, which is a halogen compound not classified as a halide, to the total mass of the flux used in the resin-cored solder supplied into the through hole formed along the central axis of the soldering iron showed excellent results in the through-hole wettability test and the reliability test (insulation reliability (insulation resistance value), halide amount (potential difference), solderability and deposition of activators).

Further containing another activator(s), other rosin or resin, and/or an additive(s) within its(their) range(s) specified in the present invention did not impair the results.

The invention claimed is:

1. A flux for resin-cored solder that is used in resin-cored solder that is supplied into a through hole formed along a central axis of a soldering iron, comprising:
   60% by mass to less than 99.9% by mass of a rosin ester relative to a total mass of the flux; and
   0.1% by mass to 15% by mass of a covalent halogen compound relative to the total mass of the flux; and
   more than 0% by mass to 10% by mass of rosin amine, N,N-diethyloctylamine, or rosin amine and N,N-diethyloctylamine relative to the total mass of the flux.

2. The flux for resin-cored solder according to claim 1, wherein the covalent halogen compound is one or two or more of trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, 2,2-bis(bromomethyl)-1,3-propanediol, tetrabromoethane, tetrabromobutane, tetrabromophthalic acid, bromosuccinic acid, and 2,2,2-tribromoethanol.

3. The flux for resin-cored solder according to claim 1, wherein the rosin ester is one or more rosin esters each being one rosin esterified or one or more rosin esters each being a mixture of two or more rosin esterified, and the rosin to be esterified is any or any mixture of natural rosin and rosin derivatives obtained from the natural rosin, wherein the rosin derivatives are: purified rosin; polymerized rosin; hydrogenated rosin; disproportionated rosin, hydrogenated disproportionated rosin; acid-modified rosin; phenol-modified rosin; an α, β-unsaturated carboxylic acid-modified product; a purified product, a hydride and a disproportionated product of the polymerized rosin; and a purified product, a hydride and a disproportionated product of the α, β-unsaturated carboxylic acid-modified product.

4. The flux for resin-cored solder according to claim 1, further comprising 0% by mass to 39% by mass of another rosin relative to the total mass of the flux.

5. The flux for resin-cored solder according to claim 1, further comprising more than 0% by mass to 39% by mass of an activator other than the covalent halogen compound relative to the total mass of the flux.

6. A resin-cored solder comprising solder filled with the flux for resin-cored solder according to claim 1.

7. A soldering method comprising:
   supplying a resin-cored solder that is solder filled with a flux for resin-cored solder including 60% by mass to less than 99.9% by mass of a rosin ester relative to a total amount of the flux, and 0.1% by mass to 15% by mass of a covalent halogen compound relative to the total mass of the flux, and more than 0% by mass to 10% by mass of rosin amine, N,N-diethyloctylamine, or rosin amine and N,N-diethyloctylamine relative to the total mass of the flux into a through hole formed along a central axis of a soldering iron; and
   heating the resin-cored solder to a temperature exceeding a melting point of the solder with the soldering iron, thereby heating a joining object and melting the resin-cored solder.

* * * * *